United States Patent
Christopoulos et al.

(10) Patent No.: US 6,526,099 B1
(45) Date of Patent: Feb. 25, 2003

(54) TRANSCODER

(75) Inventors: Charilaos Christopoulos, Sollentuna (SE); Niklas Björk, Eskilstuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/294,548

(22) Filed: Apr. 20, 1999

Related U.S. Application Data

(63) Continuation of application No. PCT/SE97/01766, filed on Oct. 22, 1997.

(30) Foreign Application Priority Data

Oct. 25, 1996 (SE) .............................................. 9603909

(51) Int. Cl.$^7$ .............................................. H04N 7/12
(52) U.S. Cl. ............................ 375/240.26; 375/240.16; 375/240.2
(58) Field of Search ........................ 375/240.26, 240.16, 375/240.2; H04N 7/12

(56) References Cited

U.S. PATENT DOCUMENTS

| | | | | |
|---|---|---|---|---|
| 5,477,397 A | | 12/1995 | Naimpally et al. | 386/123 |
| 5,828,421 A | * | 10/1998 | Boyce et al. | 375/240.26 |
| 6,005,623 A | * | 12/1999 | Takahashi et al. | 375/240.16 |

FOREIGN PATENT DOCUMENTS

| | | |
|---|---|---|
| EP | 0 687 112 A2 | 12/1995 |
| EP | 0 711 079 A2 | 5/1996 |
| EP | 0 712 251 A2 | 5/1996 |
| WO | 95/28561 | 11/1995 |

OTHER PUBLICATIONS

Koc et al., "DCT–Based Subpixel Motion Estimation", Proceedings of ICASSP 96, vol. 4, pp. 1930–1933.

* cited by examiner

*Primary Examiner*—Howard Britton
(74) *Attorney, Agent, or Firm*—Nixon & Vanderhye P.C.

(57) ABSTRACT

In a transcoder means are provided for implementing a simultaneous change in rate and in resolution. In a preferred embodiment means are also provided for transferring incoming motion vectors or the like directly to the output encoder. The transcoder architecture is both suited for implementation in the spatial as well as in the frequency domain.

21 Claims, 14 Drawing Sheets

TRANSCODER

This application is a continuation of PCT/SE97/01766 filed Oct. 22, 1997.

TECHNICAL FIELD

The present invention relates to transcoders for conversion of signals between a first and a second coding scheme. The transcoders according to the invention are particularly suitable for converting two- and three-dimensional images and video signals.

BACKGROUND OF THE INVENTION AND PRIOR ART

There are many occasions when it is necessary to transmit moving picture television over long distances via a transmission link. Broadcast quality television requires an excess of 100 Mbit/s when transmitted in digital form which is expensive to transmit and requires links of high bandwidth. An acceptable degree of degradation in the picture quality can be introduced in order to reduce the information content being transmitted. Additionally or alternatively, compression coding techniques may be used which take advantage of the high degree of spatial and temporal redundancies in the video signals being encoded.

There are also other applications where compression coding techniques are used. So, for example, for video conference applications a compression down to a bit rate of a few hundred kbit/s is possible whereas videophone-quality pictures including sound can be compressed down to less than 64 kbit/s.

Redundancy reduction techniques assume that there is a spatial and/or temporal correlation between neighbouring pixels or blocks of pixels. The details of correlation are encoded as well as the differences between the assumptions and the actual pixels or blocks. Typically each frame of an image to be coded comprises an array of picture elements (pixels) which are divided into blocks of N×M pixels.

Predictive coding exploits the assumption that a value within a frame is related to some neighbouring values, in the same or a different frame, and the value may therefore be calculated at the receiver instead of being transmitted. It is then only necessary to transmit the prediction error arising from such an assumption. For instance the first pixel of a frame may be transmitted exactly whilst each subsequent pixel is transmitted as a difference from its predecessor. In more complex schemes the prediction may be found by a combination of a number of pixels.

Transform coding exploits the correlation of pixel magnitudes within a frame by transforming the magnitudes into another set of values, many of which are expected to be relatively small and which can therefore be coded using fewer bits. The most common form of transform coding uses the Discrete Cosine Transform (DCT). A block of N×M pixels is transformed into an array of N×M transform coefficients. The resulting array of coefficients is then quantised by dividing each coefficient by a quantisation factor. The quantised coefficients may be coded by a variable length code, for instance a Huffman code.

Another coding technique is motion compensation in which a picture is divided into blocks of pixels and each block of the current frame is compared with the corresponding block of a reference frame, which may be a previous and/or a subsequent frame, and with regions shifted in position from that block, and that region of the reference frame which the block most closely resembles is identified. The vector difference in position between the identified region and the block in question is termed a motion vector and is used to shift the identified region of the reference frame into the position of the relevant block in the current frame. Motion vectors are generated for all the blocks of the current frame and these are used to derive a predicted frame from the reference frame. The differences between the current and predicted frame are, on an average, smaller than those between the current and reference frame and can be encoded using fewer bits. A decoder which already has the reference frame stored can thus reproduce the current frame using the motion vectors and the difference values. A signal may be coded using any of the aforementioned coding techniques, either separately or in combination.

Furthermore, it is reasonable to expect that in the future a wide range of quality video services like HDTV, etc. will be available together with the lower quality video services such as the video-phone and video-conference services. Multimedia documents containing video will most probably not only be retrieved over computer networks, but also over telephone lines, ISDN, ATM, or even mobile networks. The transmission over several types of links or networks with different bit rates and varying traffic load will require an adaptation of the bit rate to the available channel capacity. A main constraint on the systems is that the decoding of any level below the one associated with the transmitted format should not need the complete decoding of the transmitted source.

To maximise the integration of these various quality video services, a single coding scheme which can provide an unlimited range of video services is desirable. Such a coding scheme would enable users of different qualities to communicate with each other. For example, a subscriber to only a lower quality video service should be capable of decoding and reconstructing a digitally transmitted higher quality video signal, albeit at the lower quality service level to which he subscribes. Similarly, a higher quality service subscriber should be capable of decoding and reconstructing a digitally transmitted lower quality video although of course its subjective quality will be no better than its transmitted quality.

The problem therefore is associated with the way in which video will be transmitted to subscribers with different requirements (picture quality, processing power, memory requirements, resolution, bandwidth, frame rate, etc.). The following points summarise the requirements:

satisfy users having different bandwidth requirements,
satisfy users having different computational power,
adapt frame rate, resolution and compression ratio according to user preferences and available bandwidth,
adapt frame rate, resolution and compression ratio according to network abilities,
short delay, and
conform with standards, if required.

One solution to the problem of satisfying the different requirements of the receivers is the design of scalable bitstreams. In this form of scalability, there is usually no direct interaction between transmitter and receiver. Usually, the transmitter is able to make a bit stream which consists of various layers which can be used by receivers with different requirements in resolution, bandwidth, frame rate, memory or computational complexity. If new receivers are added which do not have the same requirements as the previous ones, then the transmitter has to be re-programmed to accommodate the requirements of the new receivers. Briefly, in bit stream scalability, the abilities of the decoders must be known in advance.

Furthermore, the design of a scalable bitstream can result in a higher number of bits compared to a single bit-stream for achieving a similar quality. A scalable bit stream also requires very computationally powerful coders, which may consist of a number of coders equal to the number of different receivers.

A different solution to the problem is the use of transcoders. A transcoder accepts a received data stream encoded according to a first coding scheme and outputs an encoded data stream encoded according to a second coding scheme. If one had a decoder which operated according to a second coding scheme then such a transcoder would allow reception of the transmitted signal encoded according to the first coding scheme without modifying the original encoder. For example, the transcoder could be used to convert a 128 kbit/s video signal conforming to ITU-T standard H.261, from an ISDN video terminal for transmission to a 28.8 Kbit/s signal over a telephone line using ITU-T standard H.263.

Most of the known transcoders decode video signals according to a first coding scheme into an uncompressed video signal which is then encoded by an encoder according to a second coding scheme to output a new compressed data stream. Thus a full decoding operation is carried out to reconstruct the original signal and then the reconstructed signal is encoded to provide a new coded data stream according to the second coding scheme. For coding methods involving motion compensation, new motion vectors have to be generated for the signal encoded according to the new coding scheme and this accounts for a large proportion of time for conventional transcoders.

Various transcoder architectures for video signals have been described recently in literature. The research has mainly concentrated on rate transcoding, i.e. transcoding from a certain bit rate to a lower one without changing the resolution.

Furthermore, the International patent application WO 95/29561 discloses a transcoder which extracts motion vectors from an incoming, received data stream and passes them to the data stream of the encoding part of the transcoder, thereby avoiding recalculation of the motion vectors.

Although the transcoder described in the above cited International patent application seems to be well suited for rate reduction, it will not work when the encoder of the transcoder has to encode the decoded video sequence (in the transcoder), at a different spatial resolution (for example CIF and QCIF). This is due to the fact that the transcoder disclosed in the International patent application WO 95/29561 applies a difference operation applied on two video signals of different spatial resolution, one originating from the decoding side of the transcoder and one from the encoding side.

Furthermore, the International patent application WO 95/29561 does not deal with the problem of how a change in spatial resolution can be implemented efficiently. Therefore, the transcoder described in WO 95/29561 is only suitable for a rate reduction, i.e. for use with coding schemes having the same spatial resolution.

Moreover, the results given in WO 95/29561 do not hold when the transmitter uses different motion accuracy than the one that the receiver uses. For example, when the transmitter uses the H.261 algorithm with integer pel accuracy and the receiver the H.263 with half pel accuracy, then a refinement of the motion vectors has to be implemented. This problem is not addressed in WO 95/29561. In addition, in WO 95/29561, the problem of changing the temporal resolution is not addressed.

The published European patent application EP 0 687 112 A2 discloses an image conversion apparatus for converting spatial or temporal resolution. The apparatus can also scale motion compensation information. This is performed by means of interpolating a central value from the mean, mode and median of target blocks and surrounding blocks.

Also, the published European patent application EP 0 690 392 A1 addresses the problem of rate conversion. However, no other reformation is performed, such as resolution reduction. In addition, EP 0 690 392 A1 is applied to MPEG compressed signals.

SUMMARY

It is an object of the invention to provide a transcoder, which can be used for bit rate modification and resolution (spatial and/or temporal) modification and having a simpler structure than existing ones.

It is also an object of the present invention to provide a transcoder which overcomes the problems associated with the conversion of resolution as outlined above and which also makes use of the computational reduction obtained by the extraction of the motion vectors, and which hence would be suitable for use when transcoding between coding schemes having different resolutions, for instance a first coding scheme having a resolution of 352×288 pixels (CIF) and a second coding scheme having a resolution of 176×144 pixels (QCIF).

It is another object of the present invention to provide a transcoder and a method for implementing a change in resolution both in the spatial and in the DCT domain.

It is yet another object of the invention to provide a transcoder and a method for fast algorithms for the DCT to be used for changing the resolution in the DCT domain.

These objects and others are obtained with a transcoder architecture comprising a decoder for decoding a video signal encoded according to a first coding scheme employing motion compensation techniques and an encoder for encoding the decoded video signal according to a second coding scheme where the second coding scheme changes the resolution (spatial and/or temporal) and the bit rate of the incoming video signal.

According to a second aspect of the invention, the motion compensation information, for example in the form of motion vectors, in the incoming video signal is extracted and, if necessary, after proper scaling and refinement, passed directly to the encoding part of the transcoder and output in the output data stream.

According to a third aspect of the invention, the encoder part of the transcoder implements the resolution reduction of the incoming video in the frequency domain, thereby having reduced computational complexity compared to the encoder that would work in the spatial domain and would require filtering operations.

According to a fourth aspect of the invention, the transcoder can utilise special variable length coders (VLC) and scanning operations suited more for the block sizes and resolutions used. The decision on which coding that is to be used can be based on negotiations with the receiver, i.e. checking if the receiver can accept the VLCs that the transcoder proposes to use.

According to a fifth aspect of the invention, the transcoder utilises special algorithms for the computation of the Discrete Cosine Transform (DCT), here termed pruning DCT which give the ability to compute only the necessary part of the DCT coefficients required for the transcoding operation.

According to a sixth aspect of the invention, both the undersampling and the oversampling (interpolation) of frames (images) is done in the DCT domain using special DCT algorithms.

According to a seventh aspect of the invention, the spatial resolution modification can be implemented in the spatial domain.

According to a eighth aspect of the invention, the transcoder can refine the motion vectors provided from the decoder of the transcoder. For example, if the motion estimation at the transmitter is performed using integer pel accuracy and half pel accuracy is required to be implemented at the encoder in the transcoder, the encoder can utilise the existing motion vectors and refine the accuracy of them.

According to a ninth aspect of the invention, the transcoder scales the motion vectors in such a manner so that they can be used efficiently when the resolution is modified.

According to a tenth aspect of the invention, the transcoder combines four incoming motion vectors in such a manner so that to produce one motion vector per macroblock during the re-encoding process.

According to an eleventh aspect of the invention, the transcoder has means for passing and refining macroblock type information from the decoder (of the transcoder) to the encoder (of the transcoder).

According to another aspect of the invention, the transcoder refines the motion vectors in a small area in such a manner so that they can be used efficiently when the resolution is modified.

According to a another aspect of the invention, the transcoder can be used to perform dynamic spatial resolution modification, i.e. change of spatial resolution from frame to frame according to the complexity of the sequence and the available bandwidth.

According to another aspect of the invention, the transcoder can be used to perform temporal resolution reduction, i.e. frame rate reduction. It can also be used to perform a combination of modification of spatial resolution, temporal resolution and dynamic resolution.

The invention provides a solution to the problem of transferring video signals to receivers with different requirements and abilities (compression and decompression algorithm, bandwidth available, computational power, frame rate requirements, resolution requirements, etc.). It provides transcoder architectures that can transcode any incoming bitstream that represents video sequences of a certain resolution (spatial and/or temporal) and compression ratio to video sequences of a resolution (spatial and/or temporal) and compression ratio that best suits the requirements and abilities of a particular receiver. The invention can be used to modify the resolution and/or compression ratio of the incoming video signal in order to satisfy the resolution, bandwidth and computational requirements of a particular receiver.

BRIEF DESCRIPTION OF THE DRAWINGS

The present invention will now be described in more detail by way of non-limiting embodiments and with reference to the accompanying drawings, in which.

DESCRIPTION OF PREFERRED EMBODIMENTS

Figure 1:
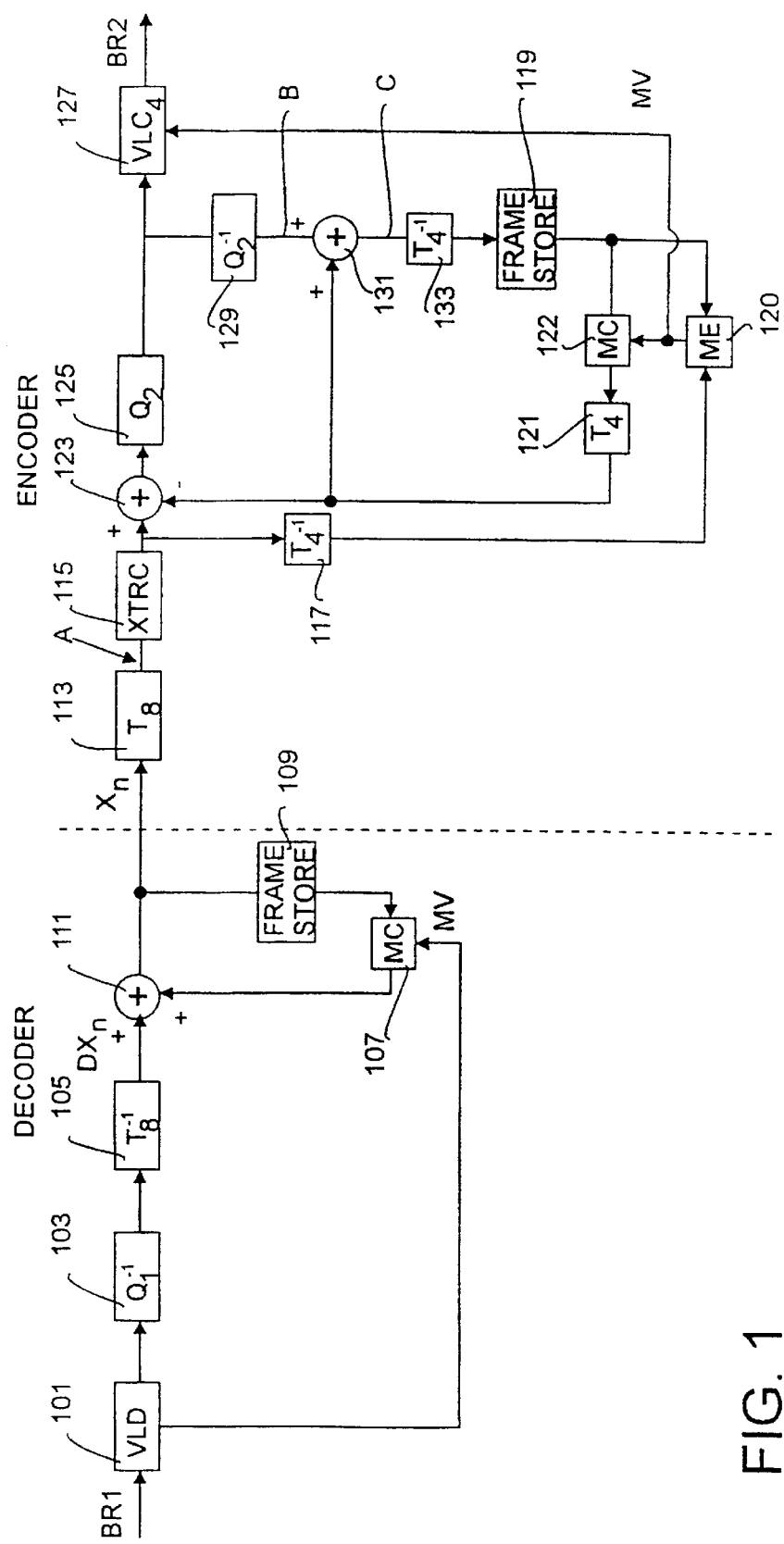
FIG. 1 is a diagram of a transcoder having the ability to change the resolution and the compression ratio.

In FIG. 1 a diagram of a transcoder which can be used for both rate reduction and resolution reduction is shown. In the following examples a resolution reduction by a factor of 2 in each dimension is described, e.g. the transcoding of a CIF image to a QCIF image. However, the technique can be applied in similar manner for other resolution reduction factors and different formats. Thus, an incoming bit stream BR1 having a first bit rate, in this example a video signal encoded according to a first coding scheme employing motion compensation and DCT coding of the difference image, for example, at 128 kbit/s, CIF conforming to the H.263 standard is entering the transcoder. The bit stream BR1 is decoded in the Variable Length Decoder (VLD) block 101, where the received data is converted into quantised DCT coefficients, quantisation indices and motion vectors (MV). The DCT coefficients are passed through an inverse quantiser 103 and an inverse DCT processor 105 which converts the DCT coefficients into pixel difference values.

The motion vectors obtained from the block 101 are fed to a motion compensator block 107 which calculates the address of the prediction pixel block of the previous frame. This block is then retrieved from a previous frame stored in a frame store 109 and added in an adder 111 to the output of the inverse DCT processor 105 to form a decoded data stream for the current block. The decoded data stream for the frame considered is stored in the previous frame store 109 as a reference for the next frame.

The decoded data ($X_n$) is also passed into the encoder of the transcoder. The encoder has to encode with a smaller resolution that the transmitter. The resolution reduction is performed in the DCT domain. Therefore, the decoded data are transformed block by block by the DCT processor 113. In the example block sizes of 8×8 are used, but larger sizes can also be used. For a resolution reduction by a factor of 2 in each dimension, only the 4×4 low frequency DCT-coefficients are useful, see K. R. Rao and P. Yip, "Discrete cosine transform: Algorithms, advantages, applications", Academic Press Inc., 1990. Therefore, the low frequency 4×4 DCT coefficients are extracted out of the 8×8 in block 115.

The output of block 115 is fed to an inverse 4×4 DCT processor 117, which reconstructs the frame which is to be used for the motion estimation/compensation part. The motion estimation in block 120 searches a previous frame store 119 for an offset block of pixels that closely resembles the current block. The motion vectors of this best-match block are calculated in the block 120 and fed to the motion compensation block 122. The output from the block 122 is DCT transformed in block 121 and subtracted from the extracted DCT coefficients in a block 123 in order to form a difference signal in the DCT domain, i.e. the frequency domain.

The signal is then quantised by quantiser $Q_2$ in a block 125, the quantiser using a step size suitable for the bit rate desired at the output of the encoder.

A variable length coder ($VLC_4$) in block 127 converts the output of the quantiser and the motion vectors from the motion estimation in block 120 into variable length codes and then outputs the data in the new format.

Optionally, the ($VLC_4$) in block 127 should be suitable for coding 4×4 DCT coefficients if 4×4 DCTs are used. Zig-zag scanning and run lengths can be optimised for the 4×4 case since the run lengths are smaller for the 4×4 case than for the 8×8. The decision of using the specially designed VLCs can be based on negotiations with the receiver, i.e. checking if the receiver can accept the VLCs that the transcoder proposes to use. In case the receiver does not accept any special VLCs, standard VLCs are used.

The encoder of the transcoder also includes a local decoder which comprises an inverse quantiser ($Q_2^{-1}$) in a block 129. The block 129 receives the data stream, i.e. the quantized coefficients fed to the block 127. The output from the block 129 and the output from the motion estimation in block 120 followed by the motion compensation in block 122 and followed by the forward DCT in the block 121 are input to an adder 131 to produce an updated predicted frame. The output from the adder 131 is fed to an inverse 4×4 processor in a block 133 and the output from the block 133 is stored in the frame store block 119.

In FIG. 1, the operation carried out in block 115 extracts the 4×4 low frequency DCT coefficients out of the 8×8 coefficients. The following part of the encoder of the transcoder consists of a complete coder except for that the DCT is now applied in blocks of dimension 4×4 instead of 8×8. The receiver has to use a decoder that also operates in 4×4 blocks. It should be noticed that if a reduction by a factor larger than 2 is required, less DCT coefficients will have to be kept. For example, if reduction by a factor of 4 in each dimension is required, then only the 2×2 DCT coefficients should be kept.

However, this may not be efficient from a compression efficiency point of view. In that case it may be more efficient to have DCTs applied in larger blocks. For example, 16×16 (in block 113) and 8×8 DCT (in blocks 117, 121 and 133) processors could be used, respectively. In the case when a change of resolution from CIF to QCIF the 16×16 and 8×8 DCTs can be used instead of the 8×8 and 4×4 DCT processors at the encoder part of the transcoder. In the case when a transcoding from CIF to SQCIF is required, the 16×16 and 4×4 DCTs can be used, or 32×32 and 8×8. Notice that if the encoding loop of the transcoder uses 8×8 DCTs, the receiver will be able to use standard 8×8 DCTs and therefore it can be a standard decoder.

However, the operation of transforming into the DCT domain, obtaining the 8×8 DCT coefficients and then keeping only a part of them introduces unnecessary computational complexity in the system. Since the transcoder knows how many DCT coefficients that are required, it will be more efficient if it directly computes those coefficients. This can be done with the pruning DCT algorithm described in Christopoulos C. A. and Skodras A. N., "Pruning the two-dimensional fast cosine transform", Proceedings of the European Signal Processing Conference (EUSIPCO), Edinburgh, Scotland, UK, Sep. 13–16, 1994, pp. 596–599, Christopoulos C. A., J. Bormans, J. Cornelis and A. N. Skodras, "The vector radix fast cosine transform: pruning and complexity analysis", Signal Processing, Vol. 43, No. 2, 1995, pp. 197–205, and Skodras A. N., "Fast discrete cosine transform pruning", IEEE Trans. on Signal Processing, 42(7), 1994.

Figure 2A:
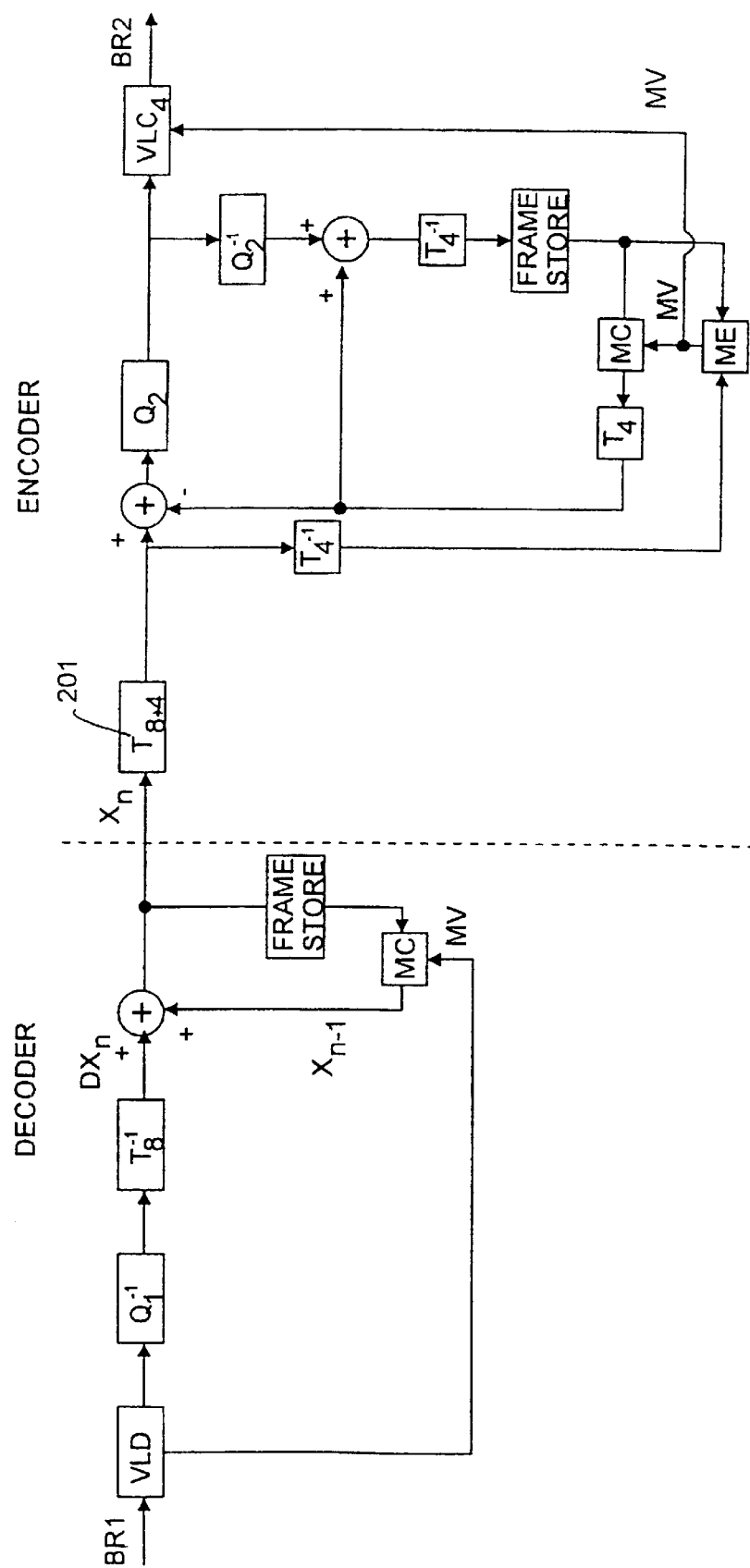
FIGS. 2a and 2b are diagrams of another transcoder in which the implementation of the resolution change is performed using the pruning DCT algorithms.

This is shown in FIG. 2a, whch is identical to the transcoder in FIG. 1 except for that the operation $T_{8->4}$ in block 201 which denotes that the transformation will compute only the 4×4 DCT coefficients out of the 8×8 directly. Thus, the block 201 in FIG. 2a replaces the blocks 113 and 115 in FIG. 1. It should be noticed that pruning DCT algorithms can be used in all steps of the encoder of the transcoder.

Figure 2B:
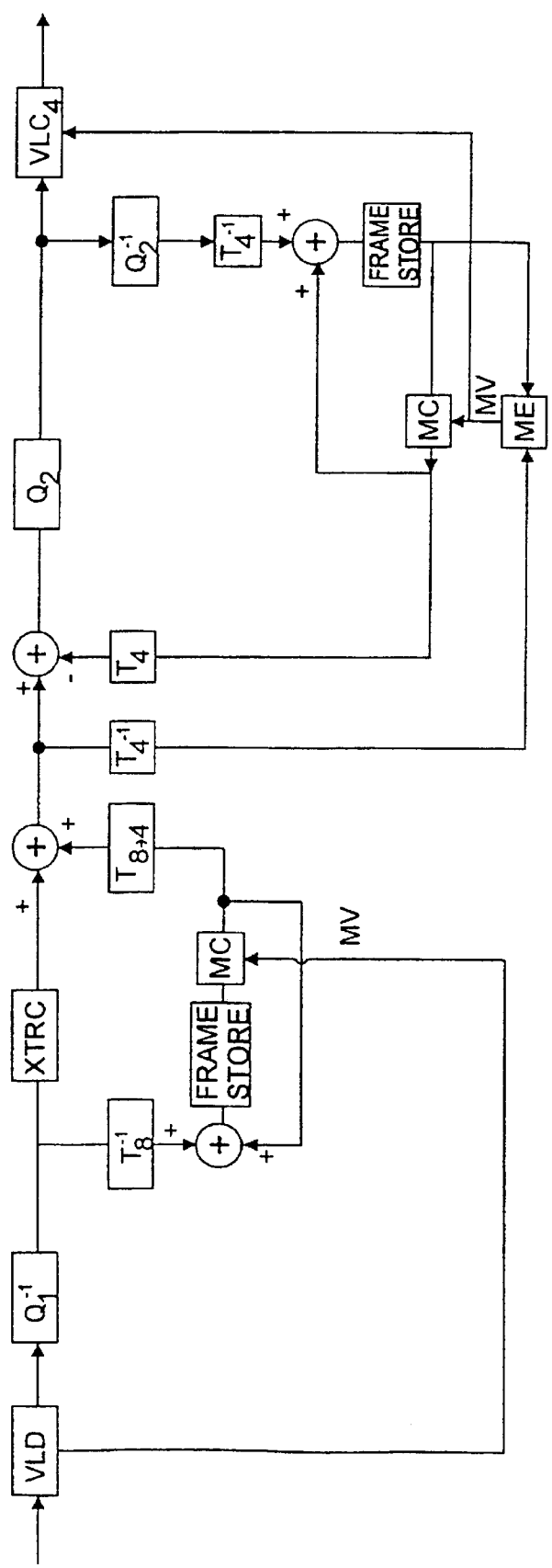

For example, it may be required to compute only the 2×2 out of the 4×4 DCT coefficients. The desired compression ratio therefore can be achieved by computing only a part of the DCT coefficients (or computing all of them and setting those not needed to zero), and by the quantisation $Q_2$ in block 125 in FIG. 1. In the case where 16×16 and 8×8 DCTs are used then the $T_{8->4}$ should be replaced by $T_{16->8}$, i.e. a computation of only the (8×8 parameters out of the 16×16, for a resolution reduction by a factor of 2 in each dimension. FIG. 2b shows a different implementation of FIG. 2a, which may have some advantages from the hardware and/or software implementation point of view. The transcoder in FIG. 2b implements exactly the same transcoder as the one shown in FIG. 2a.

Figure 3A:
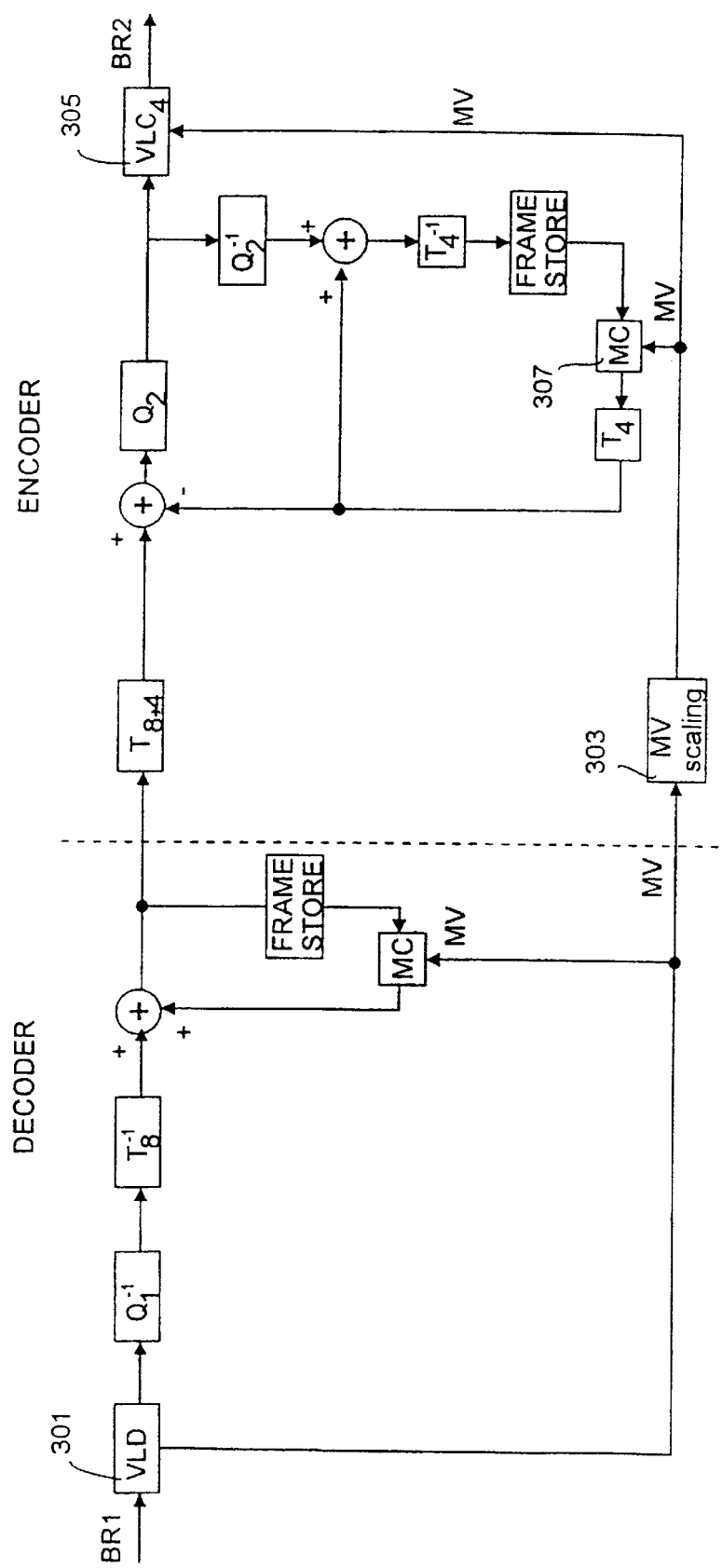
FIGS. 3a and 3b are diagrams of yet another transcoder in which motion vector extraction is implemented together with resolution reduction.
Figure 3B:
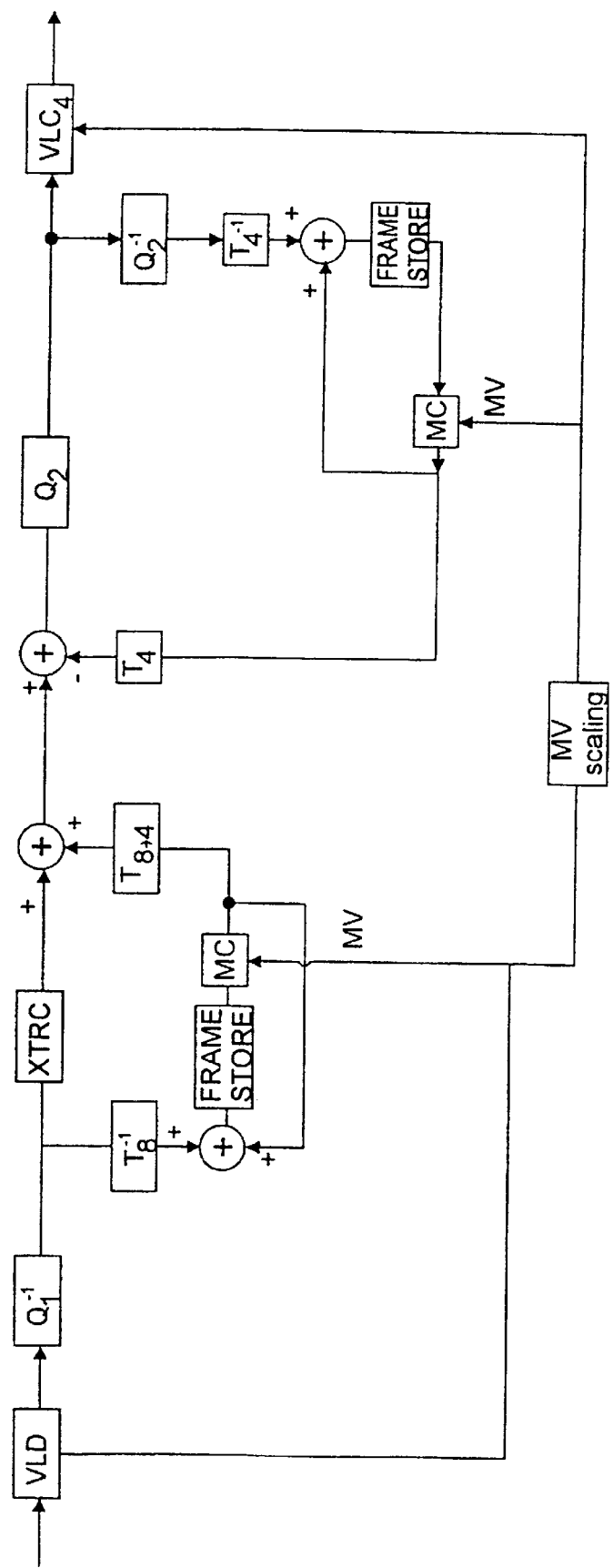

All of the transcoders shown in FIGS. 1 and 2a–2b introduce delays and complexity in the transcoder, because they require a motion estimation to be implemented. However, this can be avoided as will be shown in conjunction with FIGS. 3a and 3b, which show that the transcoders of FIGS. 1, 2a and 2b can be simplified by means of avoiding motion estimation and by using pruning DCT algorithms. The motion vectors which are available in the decoder can be directly forwarded to the encoder from the decoder after appropriate scaling and be used for the motion compensation part in the encoder. Hence, the diagrams in FIGS. 3a and 3b are much simpler than those of FIGS. 1 and 2a and 2b, since no motion estimation is now required. It also results in a smaller hardware complexity since one of the inverse 4×4 DCTs ($T_4^{-1}$) is not required.

Thus, in FIG. 3a, which is similar to FIGS. 1 and 2a–2b, the motion vectors extracted in the VLD 301 are also passed to a motion vector scaling block 303, which scales the incoming motion vectors in accordance with a required output resolution, motion compensation block sizes and the encoding method of the second coding scheme. The motion vectors output from the block 303 are then passed directly to the variable length coder 305 and to the motion compensation block 307. Hence, as a difference from the transcoder of FIG. 1, no motion estimation, shown at 120 in FIG. 1, is required for the transcoder shown in FIG. 3a. Also, the transcoder of FIG. 3a makes use of pruning algorithms as also shown in FIGS. 2a and 2b.

In FIG. 3b another possible implementation of the transcoder of FIG. 3a is shown. The implementation as shown in FIG. 3b may have advantage from a hardware and/or software point of view compared to the implementation of FIG. 3a. Thus, the transcoder in FIG. 3b implements exactly the same transcoder as the one shown in FIG. 3a. One problem introduced in FIGS. 1–3b is the necessity for using a 4×4 DCT/IDCT (for the resolution reduction by a factor of 2 in each dimension), although this can be avoided if DCT of size 16×16 is used at the entry point of the encoder of the transcoder, i.e. block 113 of FIG. 1. However, since in most cases an 8×8 DCT/IDCT is used for coding and decoding, it might be beneficial to modify the transcoders in FIGS. 1–3b, so that only 8×8 DCTS are used.

Figure 4:
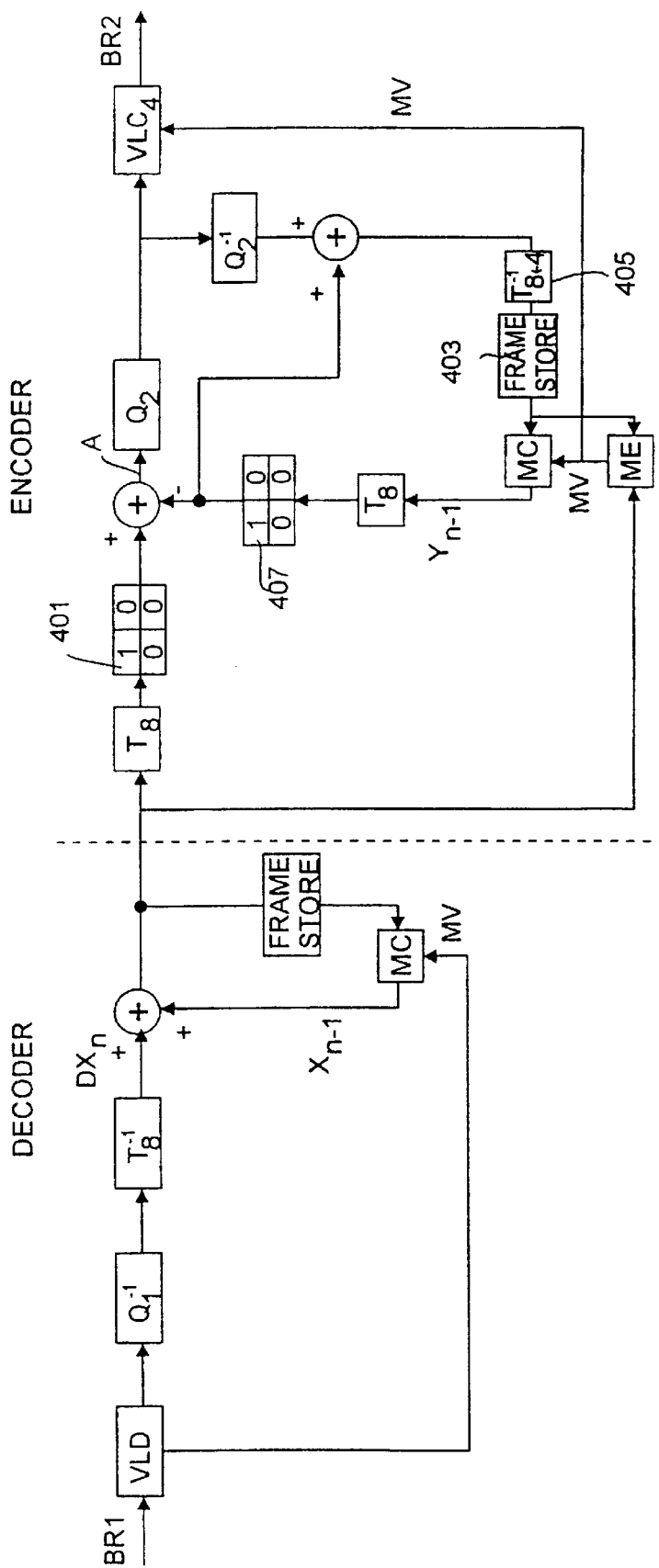
FIG. 4 is a diagram of yet another transcoder in which only 8×8 DCT processors are required for obtaining a reduction in resolution.

A transcoder that performs resolution reduction, adjusts the compression ratio to the requirements of the receiver and which is not using 4×4 DCT/IDCT is shown in FIG. 4, which at the decoder of the transcoder is the same as the one shown in FIG. 1. The 8×8 DCT coefficients are always computed but only the low frequency 4×4 DCT coefficients, which may be computed directly by DCT pruning algorithms, are used. This is shown in FIG. 4 at the block 401, which extracts the low frequency coefficients corresponding to the 4×4 DCT coefficients from the 8×8 DCT coefficients. The remaining coefficients are considered to be 0 and they are ignored. The 4×4 low frequency coefficients are quantized and coded by VLC. The VLC can be a special VLC designed for the 4×4 DCT algorithm if 4×4 DCTs are used. However, the prediction loop utilises 8×8 DCT/IDCT. The receiver can reconstruct the sequence by either using 4×4 DCTs (in that case it will reconstruct a QCIF image in our example) or 8×8 DCTs (in that case it will reconstruct a CIF image with a QCIF resolution). Notice that the above way of encoding, covers the case of a particular receiver, i.e. a receiver with a decoder that reconstructs at a certain resolution by receiving information suitable for a lower resolution sequence. In the optimum case, the transcoder will of course negotiate with the receiver before it decides which transcoding method to use.

The frame store 403 in FIG. 4 contains an image of the original size, i.e. CIF in this example, but with the resolution of the small size, i.e. QCIF in this example, obtained by taking an inverse 8×8 DCT applied to the 4×4 subblock completed with zeroes, which is shown by the block 405. This block is first 8×8 transformed and the 4×4 subblock is used as the prediction of the same subblock in the new incoming 8×8 block, i.e. the new incoming 4×4 coefficients after setting the rest of the coefficients to zero.

Figure 5A:
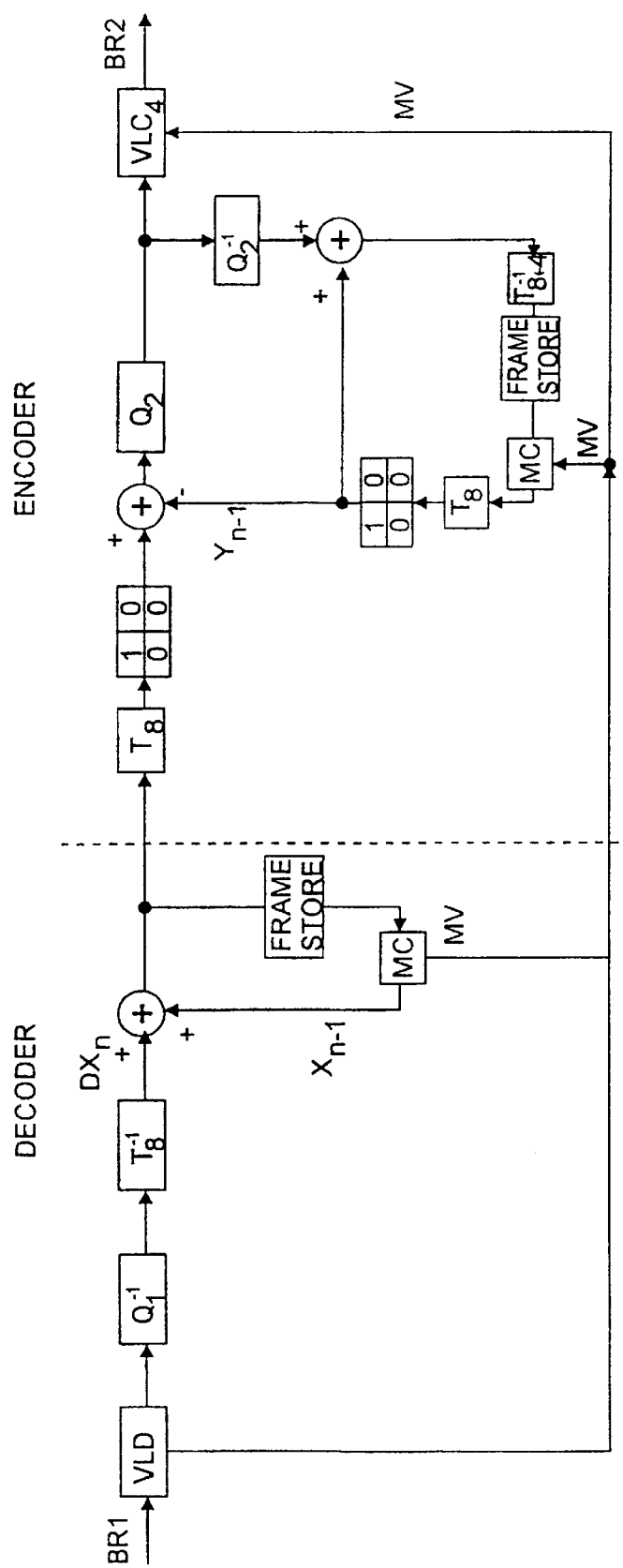
FIGS. 5a and 5b are diagrams of a transcoder similar to the one shown in FIG. 4, in which the motion vectors are passed directly from the decoder of the transcoder to the encoder of the transcoder.

FIG. 5a shows a simplified version of FIG. 4 where the motion vectors are available from the decoding part and used at the encoding part. In this manner, like in the case of the transcoder in FIG. 3, motion estimation is avoided, resulting in a transcoder architecture having a significantly reduced computational complexity.

It should be noted that for this scheme no motion vector scaling is required, if the receiver has means for performing such a motion vector scaling. The receiver can use a decoder that reconstructs the frames taking into account the way that they were encoded in the transcoder. This requires a negotiation phase between the transcoder and the receiver. If on the other hand the receiver cannot perform any motion vector scaling, and scaling is required the motion vector scaling must be performed in the transcoder. The decision on which scheme that is to be applied can be made after negotiation between the transcoder and the receiver.

Therefore, the receiver can reconstruct a CIF image with a QCIF resolution. The motion vectors can however be scaled before they are fed to the VLC, if the receiver has to reconstruct a low resolution sequence, although this is not necessary to be done at the transcoder.

Figure 5B:
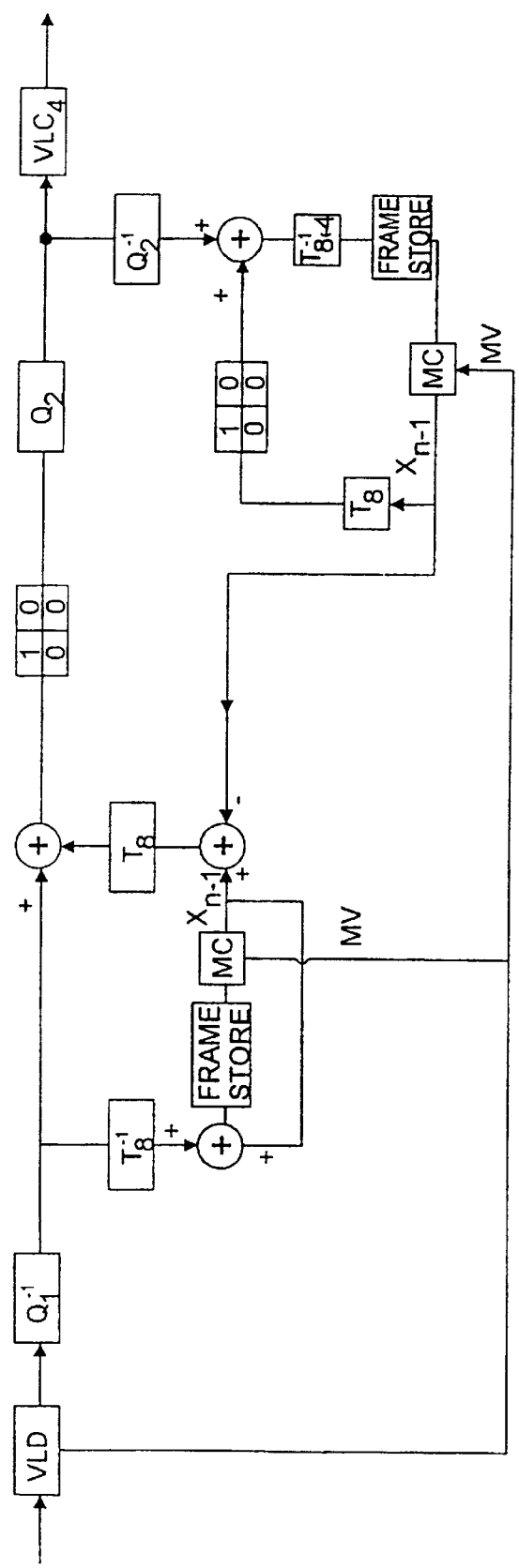

FIG. 5b shows another way of implementing the transcoder of FIG. 5a. The implementation, as shown in FIG. 5b, may be beneficial from a hardware and/or software implementation point of view.

It should also be noted that in FIGS. 4 and 5a–5b, an 8×8 IDCT is applied to the zero padded 4×4 DCT coefficients as indicated by $T_{8\leftarrow 4}$ in the FIGS. 4–5b. This is a form of interpolation in the DCT domain. This interpolation can be implemented not only by zero padding but also by the zooming algorithm described in Agbinya J. I., "Interpolation using the discrete cosine transform", Electronic Letters, Vol. 28, No. 20, September 1992. It should also be noticed that both when the zero padding or when the zooming algorithm is used, it is beneficial if the DCT/IDCT is used in such a manner that utilises the knowledge that certain coefficients are zero. This knowledge can be included in the butterfly structure of the DCT so that fast and memory efficient DCT algorithms are implemented as those described in Christopoulos C. A. and A. N. Skodras, "Pruning the two-dimensional fast cosine transform", Proceedings of the European Signal Processing Conference (EUSIPCO), Edinburgh, Scotland, UK, Sep. 13–16, 1994, pp. 596–599, Christopoulos C. A., J. Bormans, J. Cornelis and A. N. Skodras, "The vector radix fast cosine transform: pruning and complexity analysis", Signal Processing, Vol. 43, No. 2, 1995, pp. 197–205, and Skodras A. N., "Fast discrete cosine transform pruning", IEEE Trans. on Signal Processing, 42(7), 1994.

Figure 6A:
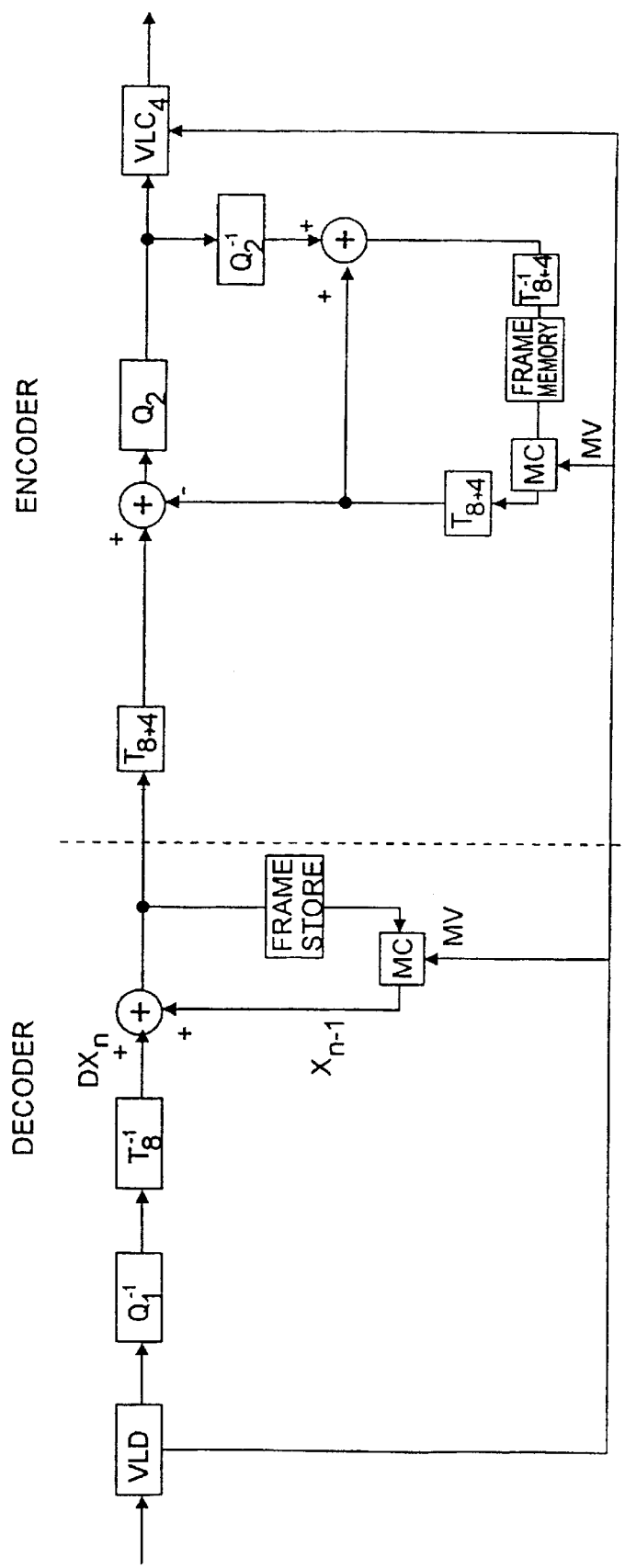
FIGS. 6a and 6b are diagrams of a transcoder similar to the transcoder shown in FIG. 5, and in which the pruning DCT algorithm is used.
Figure 6B:
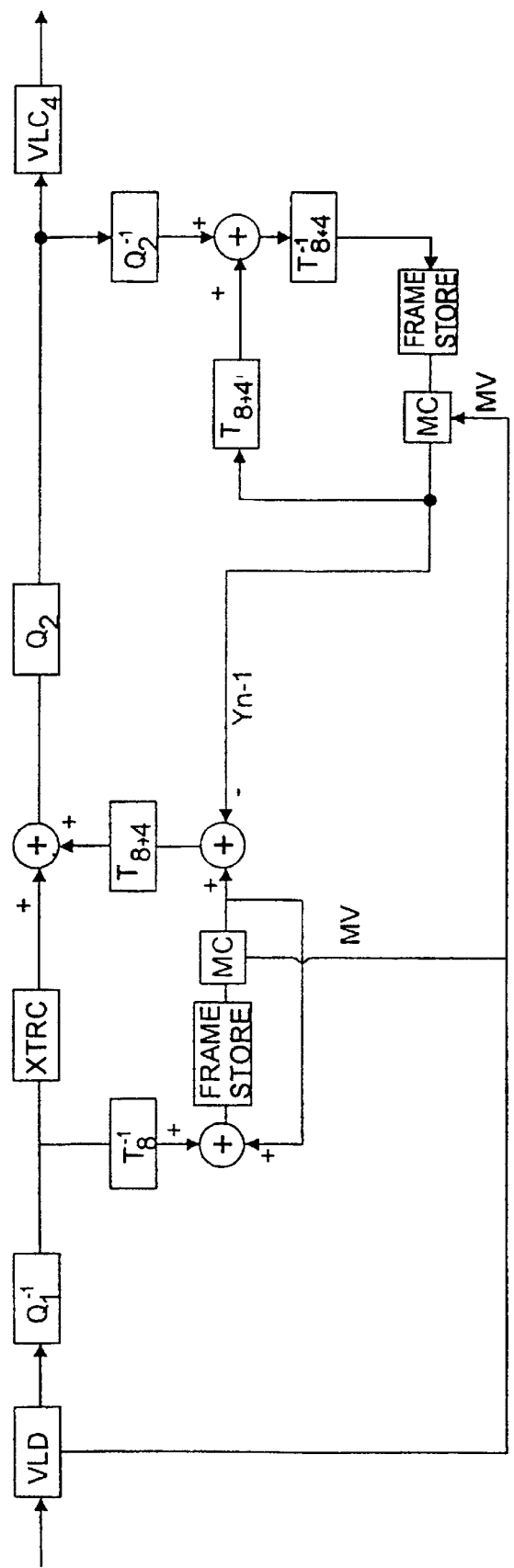

As stated above, pruning DCT algorithms can be used for fast resolution reduction. FIGS. 6a and 6b show two different examples of how this can be implemented. Thus, the transcoder in FIG. 6a is the same as the one shown in FIG. 4 but using a pruning DCT. In all the transcoders described above, the resolution reduction is performed in the DCT domain, i.e. the frequency domain. However, the resolution reduction can also be performed in the spatial domain. Such a scheme will now be described with reference to FIG. 7.

The incoming bitstream is decoded in the decoding part of the transcoder in the same manner as described above in conjunction with FIG. 1. The output sequence from the decoder of the transcoder, i.e. the decoded frames, is then undersampled, by means of an appropriate low-pass filter and undersampling operations (LPF) in a block 701 before entering the encoder part of the transcoder. In this example, undersampling by a factor of 2 in each dimension is performed. Thereafter, the reduced resolution, new sequence is encoded according to the requirements of the receiver.

Figure 7:
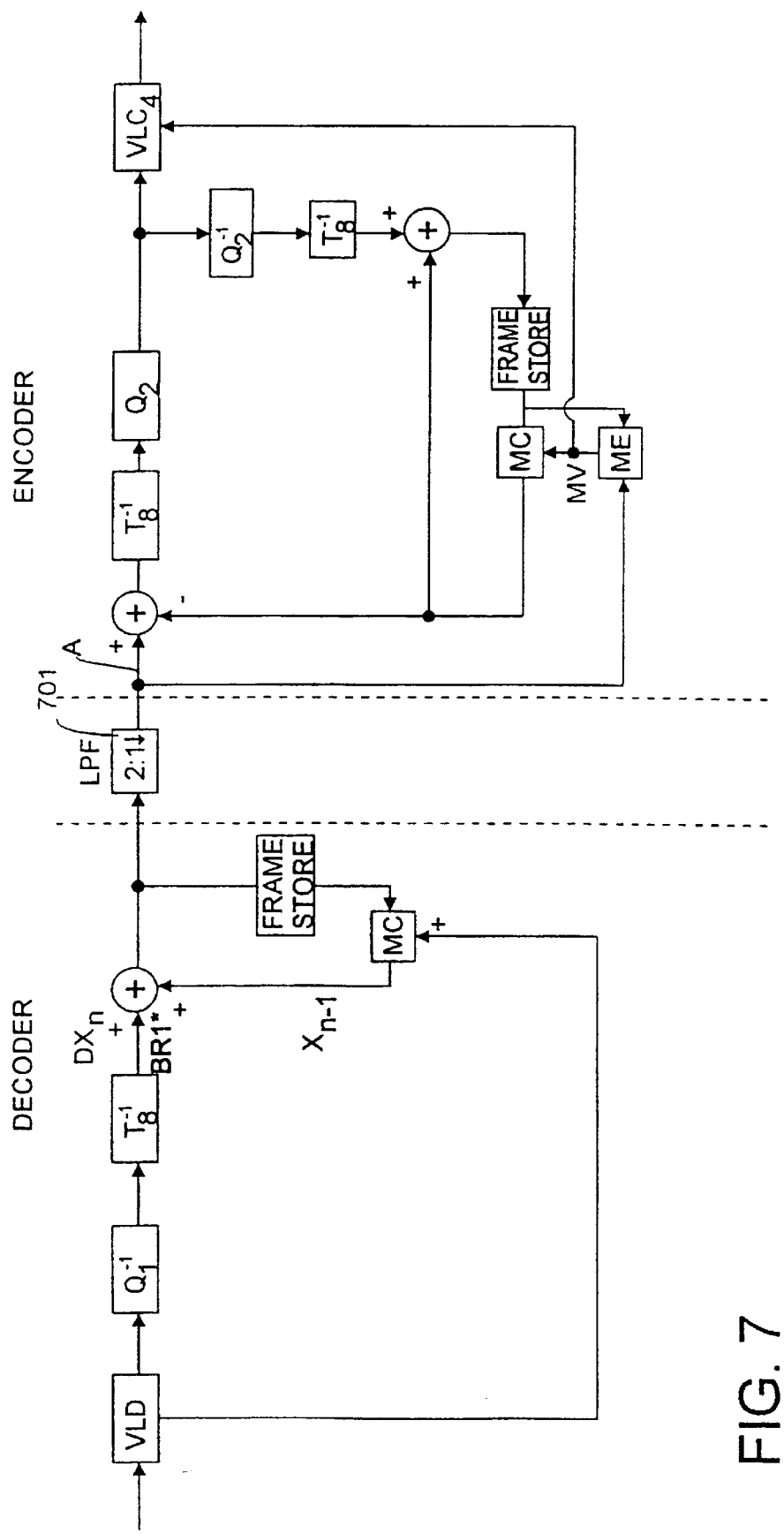
FIG. 7 is a diagram of a transcoder implementing the resolution reduction in the spatial domain.

The transcoder shown in FIG. 7, can also be made more computationally efficient. This is obtained in the same manner as outlined above, by means of a scheme where a motion estimation in the transcoder is not required. Hence, by passing the motion vectors extracted in the variable length decoder via a motion vector scaler directly to the encoding side of the transcoder no motion estimation needs to be performed.

The input signal at point A of FIG. 7 is $$LPF(DX_n + X_{n-1}) = LPF(DX_n) + LPF(X_{n-1})$$

$$= T_4^{-1}\{XTRC(BR1^*)\} + LPF(X_{n-1})$$

Figure 8A:
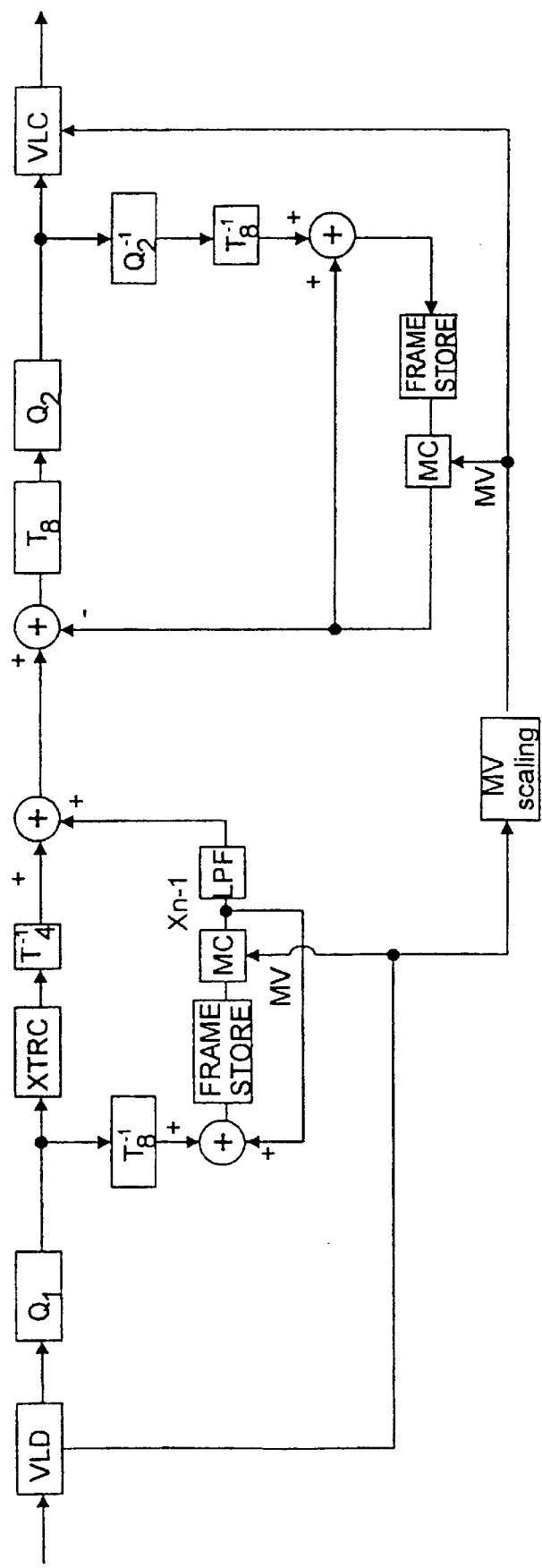
FIGS. 8a and 8b are diagrams of a yet another transcoder implementing the resolution reduction in the spatial domain which also passes the motion vectors from the decoder of the transcoder to the encoder of the transcoder.
Figure 8B:
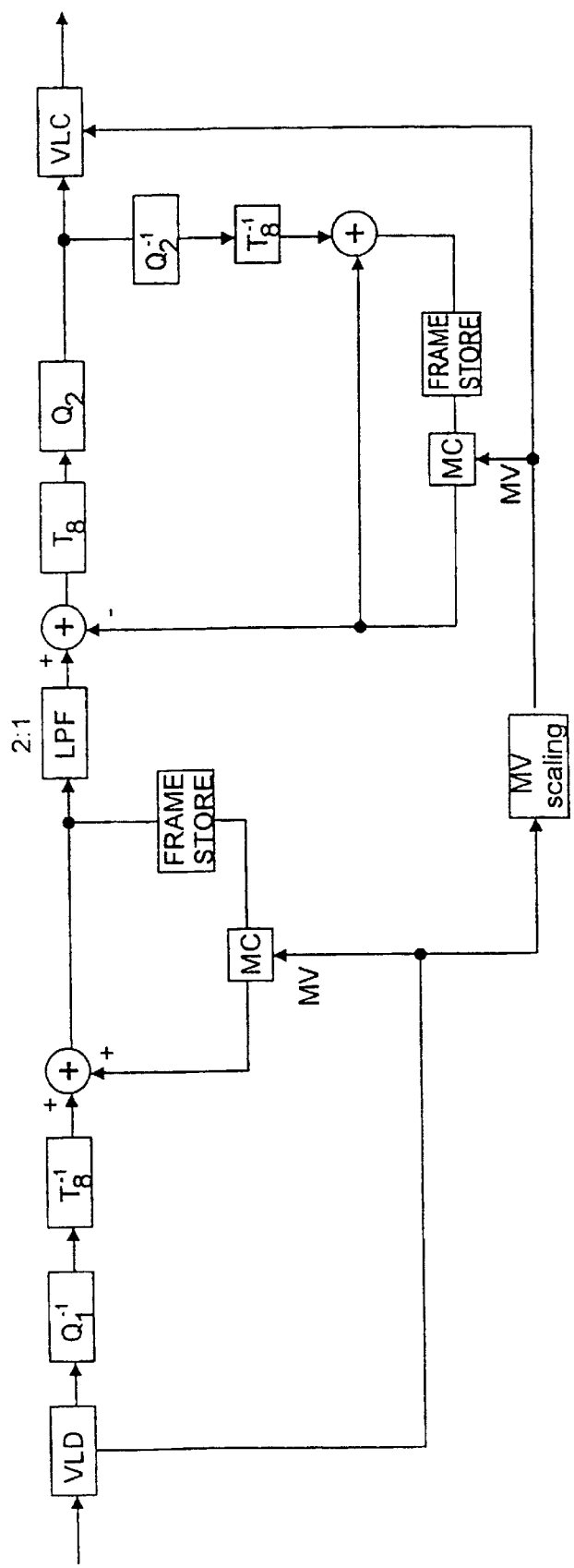

The operation $T_4^{-1}\{XTRC(BR1^*)\}$ denotes extraction of the 4×4 low frequency DCT coefficients from each of the 8×8 blocks of coefficients from BR1* and performing an inverse 4×4 DCT to each of the 4×4 blocks of coefficients to reconstruct the reduced resolution frame. A transcoder making use of the above equation is shown in FIG. 8a. It should be noted that the transcoder illustrated in FIG. 8a requires an 4×4 IDCT and therefore might be more complex than the diagram of 7. As an alternative to the transcoder shown in FIG. 8a the same transcoder can be implemented as shown in FIG. 8b.

Figure 9:
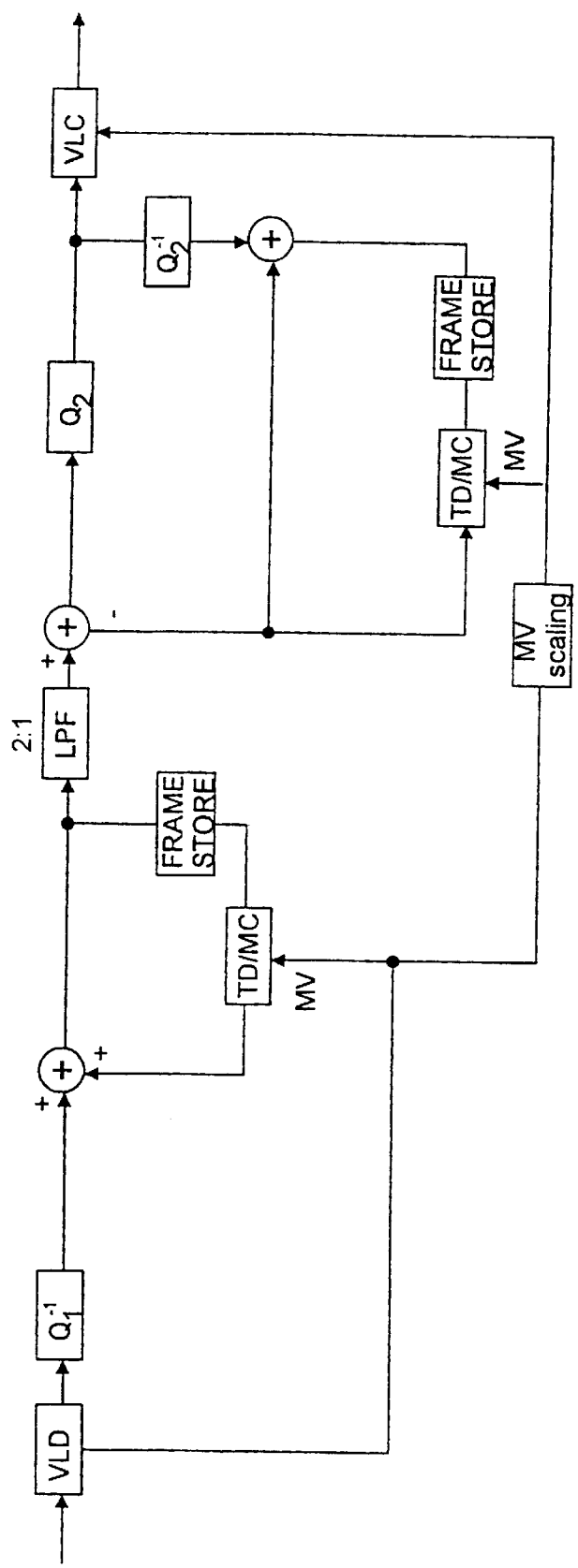
FIG. 9 is a diagram of a transcoder implementing spatial resolution modification using motion compensation information in the transform domain.

FIG. 9 shows yet another transcoder that can be used for resolution modification. The transcoder as shown in FIG. 9 is similar to the transcoder shown in FIG. 8b. However the transcoder in FIG. 9 uses encoding schemes that implement motion estimation and compensation in the DCT domain, in the blocks TD/MC, as described in Ut-Va Koc and K. J. ray Liu, "DCT-based subpixel motion estimation", Proceedings of ICASSP 96, Vol. 4, pp. 1930–1933. The advantage of the transcoder is that no DCT/IDCT processors are required.

Yet another advantage of the transcoders described above which are suitable for resolution modification is the way in which the resolution will change. The undersampling or oversampling operations can be performed for example in the following manners:

(I) Spatial Domain:
IDCT followed by low pass filtering and undersampling.

(IIa) DCT Domain:
Keeping only the necessary part of the DCT coefficients. For example, keep only the 4×4 out of the 8×8 DCT coefficients (IIb) DCT domain:
Combine the four 8×8 DCT coefficients and form the coefficients for the 16×16 block. Keep only the 8×8 DCT coefficients out of the 16×16 (for a resolution reduction by a factor of 2). Of course the block sizes that are used depend on the block sizes used in the transmitter and the receiver.

The third solution appears to be less computationally intensive. One way to form a block of DCT coefficients of a block from the DCT coefficients of its subblocks is described in W. Kou and T. Fjällbrant, "A direct computation of DCT coefficients from a signal block taken from two adjacent blocks", IEEE Trans. on Signal Processing, Vol. 39, No.7, July 1991, pp. 1692–1695. For example, method (c) can be applied in FIG. 8b and replace the XTRC and $T_4^{-1}$ operations.

Furthermore, the results obtained in the International patent application WO 95/29561 do not hold when the transmitter uses different motion accuracy than the one that the receiver uses. For example, when the transmitter uses the H.261 algorithm with integer pel accuracy and the receiver the H.263 with half pel accuracy, then a refinement of the motion vectors has to be implemented.

In such a case, the motion vectors can be passed from the decoder of the transcoder to the encoder of the transcoder and be refined. In the transcoders described above this information is not included and the motion vectors are supposed only to be scaled, in a manner that will be described in following paragraphs. Refining of the motion vectors is however useful in some cases and can be applied in all of the above described transcoders. The refinement of the motion parameters depends on the method for motion estimation and compensation used. As an example, the ITU-T standard H.263 defines how to obtain the half pel motion vectors from the integer pel ones.

Also, if the motion compensation blocks of the first coding scheme are 16×16 blocks (the motion vectors correspond to 16×16 blocks), and if the second coding scheme uses motion compensation blocks of size 8×8 then the motion vectors will be divided by 2 (for a resolution reduction by a factor of 2 in each dimension) before being transferred to the encoder of the transcoder. The above way of transferring the motion vectors to the encoder can be applied to all transcoders described above when resolution reduction is performed.

If, however, the motion compensation blocks are equal, then a problem can arise. Suppose, for example, that the first coding scheme of resolution CIF uses motion compensation blocks of size 16×16 pixels. Suppose also that the second coding scheme working in resolution QCIF uses motion compensation blocks of the same size (16×16 pixels). The motion compensated block of the second coding scheme is then actually representing four 16×16 blocks of the CIF. This is because it consists of four 8×8 blocks with each one of them representing a 16×16 block in the CIF image. The problem is then to obtain the motion vector for the 16×16 block of the second coding scheme by only knowing the motion vectors for the corresponding four 16×16 blocks of the first coding scheme.

Possible solutions to this problem are:

a) the motion vectors for the 16×16 block of the second coding scheme can be obtained by combining the four motion vectors of the corresponding four (16×16) blocks of the first coding scheme in a suitable manner, for example by averaging them and then dividing them by 2. In other words, obtain the motion vector for each of the 8×8 blocks that make the 16×16 block of the second coding scheme by the corresponding 16×16 block (after division by 2) of the first coding scheme, and combine them (for example average them)

(b) the 16×16 block of the QCIF can be divided into four 8×8 blocks and for each of these blocks to use the motion vector from the corresponding 16×16 block in the CIF after division by 2. This means that for the 16×16 block of the second coding scheme, four motion vectors are used, each one corresponding to an 8×8 part of the 16×16 block.

(c) An alternative way would be to take the median motion vector from 3 of the 4 16×16 blocks of the CIF image and scale this (i.e. divide by do 2 for transcoding of CIF to QCIF).

(d) An even simpler way is just to pick one motion vector in a random order from the 4 16×16 macroblocks of the CIF image that make the 16×16 macroblock of the OCIF image. From the computational point of view, this is the best solution.

The way that will be used depends on the abilities of the receiver. If the receiver accepts only one motion vector per block, then the first or the third solution is used. Similarly, if the receiver accepts only four motion vectors per block, the second or fourth solution is used. If however the receiver accepts both solutions, then the transcoder can either negotiate with the receiver on the method that will be used, or test both these methods and decide which one to use. One way of deciding which method to use is to check which of these methods produce the smallest error, for example according to the mean square error. Since, however, coding four motion vectors will in most cases require more bits that coding one motion vector, a threshold might have to be used. For example, the second method is used if it produces 20% less error compared to the first one. The above methods of transferring the motion vectors to the encoder can be applied to all transcoders described above.

Notice that the motion vectors obtained with this manner might not be the correct ones (especially in the case where a random motion vector is selected). A way to improve the result is to refine the motion vectors in a small window around the obtained motion vectors. For example, the refinement can be done in a search window of size (−3, +3). Usually size (−1, +1) gives a significant improvement in the predicted motion vector. Fast algorithms can be used for refining the motion vectors. Refinement of motion vectors can also be implemented only for specific macroblocks that are not well predicted. For example, before refining the motion vectors, the prediction error can be tested and if it is above certain threshold values, a motion vector refinement for that macroblock is implemented. Else no refinement of the motion vector is needed. One other way to decide whether motion vector refinement is needed is to check the amount of bits in which macroblocks were coded. Those macroblocks that were coded by an amount of bits above a certain threshold will probably need a motion vector refinement, since the number of bits corresponds to the complexity of the macroblock (macroblocks with lot of high frequency information usually require more bits compared to those that do not contain high frequency information).

If the motion compensation blocks of the first coding scheme are smaller than the ones of the second coding scheme, then an excess in motion vectors for the second coding scheme will be at hand. For example, if the first coding scheme uses 8×8 blocks and the second coding scheme uses 16×16 blocks, then there is an excess in motion vectors for the second coding scheme. The motion vectors for the 16×16 blocks of the second coding scheme can in such a case be found by combining the motion vectors for the four 8×8 blocks that constitute the 16×16 block (for example by averaging them). The motion vector for each of the 8×8 block of the second coding scheme can be found by combining the four motion vectors for the 8×8 blocks (of the first coding scheme) which made the 8×8 block of the second coding scheme, possibly by averaging them and dividing by 2. For other combinations of input and output blocks, a similar technique is used.

If the first coding scheme operates in an advanced prediction mode, like the one that is described in ITU H.263 standard then the motion vectors for the second coding scheme will have to be combined appropriately. For example, in ITU H.263 standard, in the advanced prediction mode four motion vectors per macroblock may exist. In that case the motion vectors for a macroblock of the second coding scheme are derived by calculating the sum of the four luminance vectors (of the first coding scheme) and dividing the sum by 8. Motion vector refinement can also be performed here.

Notice that above the procedure for obtaining the motion vectors for the second coding scheme is described when the resolution of the second coding scheme is reduced by a factor of 2 in each dimension. It is clearly understood that similar ideas hold when resolution reduction by different factors is required, but of course the scaling factors have to be adapted accordingly.

Above a procedure for obtaining the motion vectors for the luminance component of a colour video signal is described. The procedure for obtaining the motion vectors for the chrominance components of the second coding scheme depends on the format used. If the 4:2:0 format is considered, i.e. the chrominance matrices are one half the size of the luminance matrix in both horizontal and vertical dimensions, then both the horizontal and the vertical component of the motion vectors (of the second coding scheme) corresponding to the luminance are scaled by dividing by 2.

In the case of a 4:4:4 format, i.e. the chrominance matrices have the same dimension as the luminance, the motion vectors found for the luminance component of the second coding scheme will also be used without any scaling to the chrominance components (of the second coding scheme).

If the 4:2:2 format is used, i.e. the chrominance matrices are one half the luminance matrix in the horizontal dimension and the same as the luminance matrix in the vertical dimension, the horizontal component of the motion vectors is scaled by dividing by 2 and the vertical component is not altered.

Optionally, loop filters (see for example ITU-T standard H.261) may be used in the encoders and/or decoders. They are however not shown in the diagrams but are considered part of the invention.

The computational complexity can be further reduced by passing from the decoder (of the transcoder) information about the macroblock types to the encoder (of the transcoder). So in that case the encoder (of the transcoder) does not have to calculate the macroblock coding types. If no resolution modification was performed, then if a macroblock was coded as INTRA or SKIPPED, then in will still be coder as INTRA or SKIPPED respectively in the transcoder. However, a macroblock that was coded as INTER, might be coder as SKIPPED in the encoder of the transcoder, since after the requantization process, all coefficients might become zero. In this case therefore it is important to check if the coefficients are all set to zero after the re-quantization and if they are set to zero, then this macroblock will be coder as SKIPPED and not INTER. Of course re-evaluation of the macroblock types can also be performed, but this is not beneficial from the computational point of view. Notice also that a macroblock that was coded as INTER might be better to be coded as INTRA in the transcoder. This can be decided according to the INTER/INTRA selection mode used in the standard.

When a resolution reduction is implemented in the transcoder, a similar problem that appears with passing motion vectors appears also with passing macroblock type information. Although the macroblock coding types can be re-evaluated at the encoder (of the transcoder), the following method can be used to speed-up computation: if there was at least one INTRA macroblock in the 4 16×16 macroblocks of the CIF, then code the corresponding macroblock in QCIF as INTRA. If all macroblocks were coded as SKIPPED, then code the macroblock as SKIPPED also. If there was no INTRA and there was at least one INTER, then code the macroblock in QCIF as INTER. In the last case a further check is also done to find out if all coefficients after quantization are set to zero. If they are set to zero, then the macroblock is coded as SKIPPED.

In many cases, a combination of spatial-temporal resolution reduction is required. This can be the case where the bandwidth available (from the transcoder to the receiver) is limited or when the computational power of the receiver is not enough to decode incoming bitstreams at a certain frame rate.

Temporal resolution reduction, i.e. frame rate reduction, can also be implemented using the above diagrams. A simple way to reduce the frame rate is to drop some of the bidirectional predicted frames, so called B frames, from the coded sequence. B frames are coded using motion compensated prediction from either past and/or future I-frames or P-frames. I-frames are compressed using intraframe coding; whereas P-frames are coded using motion-compensated prediction from past I-frames or P-frames. Since B-frames are not used in the prediction of other B or P-frames, a dropping of some of them will not affect the quality of the future frames. The motion vectors corresponding to the skipped B frames will also be skipped. The diagrams describing the transcoder architectures can easily be modified to perform temporal resolution reduction by means of only applying a 'drop B-frame' procedure to the diagrams shown. Notice that the temporal resolution reduction can be implemented independently of the coding schemes used at the transmitted and the receiver, for example it can be applied in transcoding from a wavelet based coding scheme to a DCT based one.

Notice that in H.263, the 'PB' frame is also specified. A PB-frame consists of one P-picture and one B-picture. The PB frame consists of two pictures coded as one unit. Information about the B and P picture is interleaved in the macroblock level in such a way that the information for each P-block is immediately followed by the information for the related B block. At the decoder of the transcoder, the P macroblocks are reconstructed first and the B macroblocks are bidirectionally predicted from the reconstructed P macroblock and the previous P picture. In frame rate transcoding, there is no need to reconstruct the B macroblocks since they are not needed. This also saves the additional memory needed for storing the B pictures.

In case where B pictures are not used at all, a frame rate transcoding is still possible to be implemented. However, complete reconstruction of frames is needed and passing of motion vectors and macroblock types information needs to be done carefully. The more frames being discarded, the less the chance is for the passed motion vectors to be fairly close to the real motion vectors, i.e. those estimated by the transmitter (this also holds for the macroblock type information). A simple solution to this problem is to re-evaluate always the macroblock coding types and for the motion vectors of a certain frame to use the passed motion vector (after averaging and scaling for example) and refine it in a small window around the computed value. This works very well for most of the typical video-conference applications, but is not very good in applications with a lot of motion. In this case, the refinement has to be done in a larger window, maybe (−5, +5). Fast algorithms can be used to speed up the refinement procedure.

It should also be noted that in cases when the available bandwidth from the transcoder to the receiver is significantly reduced or when the receiver has a limited computational complexity and is not able to decode the incoming sequence at a certain frame rate, the encoder (at the transcoder) can decide to use only I frames, i.e. intra coded methods. Therefore, it may decide to encode the incoming sequence in intra mode or to use only the intra coded frames of the incoming sequence. In such a case, a transcoder performing spatial/temporal resolution is implemented easily with the above diagrams. Notice that the method can be implemented independently of the coding schemes used at the transmitter and the receiver, for example it can be applied in transcoding from a wavelet based coding scheme to a DCT based one.

Furthermore, the method of temporal resolution reduction also applies in the case when the spatial resolution is not changed. Thus, any of the transcoders as described above can change the temporal resolution without having to change the spatial resolution. Again, it is possible to easily adapt the diagrams in order to perform temporal resolution and rate conversion without performing any resolution reduction, i.e. spatial resolution reduction.

Moreover, if no motion compensation is used, the above diagrams can also be used. The motion vectors and motion compensation are not needed. The transcoders as described herein can then easily be adapted to work for coding schemes that do not use motion compensation. It should also be noted that even in the case when the first coding scheme is using motion compensation, the encoder of the transcoder can decide not to use such a scheme. The same is valid when the first coding scheme is not using motion compensation, if this is the case the transcoder can still utilise motion compensation for the second coding scheme. Yet again, the transcoder can easily be adapted to work in any combination.

Moreover, in the case when the transcoder is designed to receive a scalable bitstream, it will reconstruct all layers and encode them according to the requirements of the receiver. This avoids having a receiver that receives and decodes scalable bitstreams. Hence the decoder can be a standard decoder, which is a major advantage for the receiver. Notice also that the transcoder does not have to reconstruct the whole bitstream, but only the layers necessary for a particular receiver. For example, if the scalable bitstream has layers for 20, 112 and 300 kbit/s and the receiver accepts 64 kbit/s, only the first 2 layers need to be reconstructed in the transcoder.

As an additional application, the transcoders described can be used for increasing the resolution of the incoming video. Although this might increase the bit rate required from the second coding scheme, it can be useful for the case in which the receiver is not able to implementing this operation at its site. For example, to increase the resolution from QCIF to CIF, then the blocks 113 and 115 should be replaced by an oversampling operation.

The encoder could then use 8×8 DCTs. In a similar manner, oversampling can be implemented in the spatial domain. It is also understood that the motion vectors now have to be scaled accordingly, i.e. instead of divided by 2 as in the above example, they should be multiplied by 2.

In another application, the transcoder can be used to transcode incoming still images or 3D images (as those found in medical applications) to different resolution (reduced or increased). For example, to reduce the resolution of a CIF image to QCIF one can either (a) decode the still image, undersample and encode the new resolution, (b) keep only a part of the DCT coefficients, i.e. 4×4 out of the 8×8 for each DCT block or (c) combine the DCT coefficients of four 8×8 DCT blocks to form the DCT coefficients of the 16×16 block and keep only the low frequency 8×8 of them. A similar method to the one described in W. Kou and T. Fj̈allbrant, "A direct computation of DCT coefficients from a signal block taken from two adjacent blocks", IEEE Trans. on Signal Processing, Vol. 39, No.7, July 1991, pp. 1692–1695, can be used for method (c). The last technique avoids the requirement that a receiver has to use a different block size than 8×8 (as in case b) and has reduced computational complexity than method (a) which requires decoding, filtering and encoding operations. Transcoding of video signals to still images (for example H.263 to Motion JPEG) is also possible with the methods described in this patent.

Finally, the transcoders can be used for perform dynamic resolution modification, i.e. change of resolution from frame to frame. For example, if the bandwidth from the transcoder to the receiver is limited, the resolution of the incoming video in the transcoder is high and a significant amount of motion exists then the transcoder performs resolution reduction (and rate reduction if necessary). When the amount of motion drops to a low value then the transcoder does not change the resolution (or it changes to a lower value) and it adapts only the bit rate, or it even increases the resolution to a value larger than the one of the incoming video. This technique may require a negotiation phase between the transcoder and the receiver. It is evident that the diagrams can be modified easily to perform only rate reduction if this is required.

The transcoder architectures described herein can be implemented with minimum delay and low cost. The transcoders described are in particular suitable when a resolution change (spatial and/or temporal) is required and adaptation to a specific bandwidth for a particular receiver. The transcoder can be put in the network, in a video server, a gateway or a multipoint communication unit (MCU) and can handle all video requirements of the various receivers.

The method can be used in similar manner when other compression methods are used. For example it can be used when wavelet-based video coding is used or vector quantization methods. Also, it can be used for transcoding from a particular compression method to a different one. Finally, the architecture of the transcoders as described herein have very low complexity which is an advantage when the transcoders are implemented in hardware and/or software.

What is claimed is:

1. A transcoder comprising:
    means for decoding an incoming video signal coded according to a first coding scheme and means for encoding an outgoing video signal according to a second coding scheme,
    means for coding the outgoing video signal with a changed resolution (spatial and/or temporal), and
    means for performing the resolution change for the outgoing video signal in the frequency domain.

2. A transcoder according to claim 1, in the case when the incoming and outgoing video signals are coded with coding schemes employing motion compensation, characterised in that the transcoder has means for extracting the motion compensation parameters from the incoming video signal and for transferring the motion compensation information to the encoder outputting the outgoing video signal.

3. A transcoder according to claim 2, characterised by means for performing refinement of the motion vectors provided from the decoder of the transcoder.

4. A transcoder according to any of claim 1, characterised by means in the encoder of the transcoder for performing pruning DCT algorithms in order to achieve fast transcoding.

5. A transcoder according to any of claim 1, characterised by means in the transcoder for performing interpolation in the DCT domain with zero padding or according to a zooming algorithm.

6. A transcoder according to any of claim 1, characterised by quantization means in the encoder of the transcoder means in order to output a required compression ratio.

7. A transcoder according to any of claim 1, characterised by variable length encoding means in the encoder of the transcoder adapted for the block size and resolution used.

8. A transcoder according to any of claim 1, characterised by means for performing a change in spatial resolution between successive transmitted frames.

9. A transcoder according to claim 8, characterised by means for changing the spatial resolution in accordance with the bandwidth available at the receiver site.

10. A transcoder according to claim 1, characterised by means for transcoding the outgoing DCT transformed video signal into another resolution without using any DCT/IDCT processors.

11. A method comprising:
    transcoding an incoming video signal coded according to a first coding scheme into an outgoing video signal according to a second coding scheme wherein the outgoing video signal is encoded with a changed resolution (spatial and/or temporal),
    wherein the resolution change is performed in the frequency domain.

12. A method according to claim 11, in the case when the incoming and outgoing video signals are coded with coding schemes employing motion compensation, characterised in that motion compensation information is extracted from the incoming video signal and that the motion compensation information is transferred to the encoder outputting the outgoing video signal.

13. A transcoder according to claim 12, characterised in that the motion vectors provided from the decoder of the transcoder are refined in the case when the accuracy required from the output sequence is different than that of the input sequence.

14. A method according to any of claim 11, characterised in that the resolution change is performed in the spatial domain.

15. A method according to any of claim 11, in the case when DCT algorithms are employed, characterised in that pruning DCT algorithms are used in order to achieve fast transcoding.

16. A method according to any of claim 11, characterised in that the interpolation is performed using zero padding or according to the zooming algorithm when the output has a higher resolution than the input.

17. A method according to any of claim 11, characterised in that the a required compression ratio is obtained by selecting a suitable quantasiation factor.

18. A method according to any of claim 11, characterised in that output sequence from the transcoder is adapted according to the block size and resolution used, by means of applying a variable length encoder suitable for the particular block size and resolution used.

19. A method according to any of claim 11, characterised in that a change in resolution between successive transmitted frames is performed in accordance with the present transmission conditions.

20. A method according to claim 19, characterised in that the resolution is changed in accordance with the bandwidth and/or requirements available at the receiver site.

21. A method according to claim 11, when the incoming video signal is a DCT transformed video signal, characterised in that the outgoing DCT transformed video signal is transcoded into another resolution without using any DCT/IDCT processors.

* * * * *